(12) United States Patent
Huang et al.

(10) Patent No.: US 8,383,557 B2
(45) Date of Patent: Feb. 26, 2013

(54) DUAL-FUNCTIONAL BREAKER FOR HYBRID FLUIDS OF VISCOELASTIC SURFACTANT AND POLYMER

(75) Inventors: Tianping Huang, Spring, TX (US); James B. Crews, Willis, TX (US)

(73) Assignee: Baker Hughes Incorporated, Houston, TX (US)

( * ) Notice: Subject to any disclaimer, the term of this patent is extended or adjusted under 35 U.S.C. 154(b) by 438 days.

(21) Appl. No.: 12/815,796

(22) Filed: Jun. 15, 2010

(65) Prior Publication Data

US 2010/0314113 A1 Dec. 16, 2010

Related U.S. Application Data

(63) Continuation-in-part of application No. 12/404,723, filed on Mar. 16, 2009, and a continuation-in-part of application No. 11/679,018, filed on Feb. 26, 2007, now Pat. No. 7,723,272, and a continuation-in-part of application No. 11/755,581, filed on May 30, 2007, now Pat. No. 7,550,413, which is a continuation-in-part of application No. 11/125,465, filed on May 10, 2005, now Pat. No. 7,343,972.

(60) Provisional application No. 61/037,179, filed on Mar. 17, 2008, provisional application No. 60/815,693, filed on Jun. 22, 2006, provisional application No. 60/570,601, filed on May 13, 2004.

(51) Int. Cl.
*C09K 8/64* (2006.01)
*E21B 43/25* (2006.01)

(52) U.S. Cl. ........ 507/201; 507/240; 507/244; 507/245; 507/254; 507/259; 507/263; 507/265; 507/266; 507/267; 507/271; 507/273; 166/308.1

(58) Field of Classification Search ........................ None
See application file for complete search history.

(56) References Cited

U.S. PATENT DOCUMENTS

| | | |
|---|---|---|
| 5,964,295 A | 10/1999 | Brown et al. |
| 6,022,494 A | 2/2000 | Sartori et al. |
| 6,613,720 B1 | 9/2003 | Feraud et al. |
| 7,066,260 B2 | 6/2006 | Sullivan et al. |
| 7,081,439 B2 | 7/2006 | Sullivan et al. |

(Continued)

OTHER PUBLICATIONS

J. B. Crews, et al., "Internal Phase Breaker Technology for Viscoelastic Surfactant Gelled Fluids," SPE 93449, 2005 SPE International Symposium on Oilfield Chemistry, Feb. 2-4, 2005.
J.B. Crews, et al., "New Fluid Technology Improves Performance and Provides a Method to Treat High Pressure and Deepwater Wells," SPE 103118, 2006 SPE Annual Technical Conference and Exhibition, Sep. 24-27, 2006.

*Primary Examiner* — John J Figueroa
(74) *Attorney, Agent, or Firm* — Mossman Kumar & Tyler PC (57) ABSTRACT

Incorporating water-based polymer breakers, such as oxidizers, enzymes and/or acids, into a mixture of an oil and oil-soluble surfactants creates an emulsion that can then perform as a dual-functional breaker for reducing the viscosity of hybrid fluids gelled with both a viscoelastic surfactant (VES) and a polymer. The outer phase of the dual-functional breaker emulsion is oil, e.g. a mineral oil, containing an oil-soluble surfactant that will, over time and with heat, break the VES portion of the gel. As it does so, the polymer breaker in the internal aqueous phase will be released to then break the polymer portion of the gel. The polymer breaker will not start to break the polymer gel before the oil-soluble surfactant starts to break the VES gel. The overall breaking using the emulsion is slower as compared to introducing the polymer breaker and the oil-soluble surfactant in a non-emulsified form.

17 Claims, 1 Drawing Sheet

U.S. PATENT DOCUMENTS

| | | |
|---|---|---|
| 7,084,095 B2 | 8/2006 | Lee et al. |
| 7,343,972 B2 | 3/2008 | Willingham et al. |
| 7,550,413 B2 | 6/2009 | Huang et al. |
| 7,696,135 B2 | 4/2010 | Crews et al. |
| 7,723,272 B2 | 5/2010 | Crews et al. |
| 2001/0036905 A1* | 11/2001 | Parlar et al. .................. 507/200 |
| 2003/0234103 A1 | 12/2003 | Lee et al. |
| 2008/0202744 A1 | 8/2008 | Crews et al. |

* cited by examiner

DUAL-FUNCTIONAL BREAKER FOR HYBRID FLUIDS OF VISCOELASTIC SURFACTANT AND POLYMER

CROSS-REFERENCES TO RELATED APPLICATIONS

This application is a continuation-in-part application of U.S. Ser. No. 12/404,723 filed Mar. 16, 2009 which claims the benefit of U.S. Provisional Patent Application No. 61/037,179 filed on Mar. 17, 2008, and which is a continuation-in part application of U.S. patent application Ser. No. 11/679,018 filed on Feb. 26, 2007, issued May 25, 2010 as U.S. Pat. No. 7,723,272, and is a continuation-in part of U.S. patent application Ser. No. 11/755,581 filed on May 30, 2007, issued Jun. 23, 2009 as U.S. Pat. No. 7,550,413, which in turn claims the benefit of U.S. Provisional Patent Application No. 60/815,693 filed on Jun. 22, 2006, and is a continuation-in part application of U.S. patent application Ser. No. 11/125,465, filed on May 10, 2005, issued Mar. 18, 2008 as U.S. Pat. No. 7,343,972 which in turn claims the benefit of U.S. Provisional Patent Application No. 60/570,601 filed May 13, 2004.

TECHNICAL FIELD

The present invention relates to aqueous, viscoelastic fluids, such as those used during hydrocarbon treatment operations, and more particularly relates, in one non-limiting embodiment, to hybrid viscoelastic fluids gelled by both viscoelastic surfactants (VESs) and polymers, and methods and compositions for "breaking" or reducing the viscosity of such hybrid fluids.

BACKGROUND

Hydrocarbons such as oil, natural gas, etc., may be obtained from a subterranean geologic formation, e.g., a reservoir, by drilling a well that penetrates the hydrocarbon-bearing formation. This provides a partial flowpath for the hydrocarbons to reach the surface. In order for oil to be produced, that is travel from the formation to the well bore (and ultimately to the surface), there must be a sufficiently unimpeded flowpath from the formation to the well bore. Unobstructed flow through the formation rock (e.g., sandstone, carbonates) is possible when rock pores of sufficient size and number are present for the oil to move through the formation.

However, as is becoming more generally known, greater effort and more varied approaches must be undertaken to produce hydrocarbons since the relatively easier to produce subterranean formations have generally been found. Thus, the oil and gas industry is looking at producing hydrocarbons from subterranean formations where recovering the hydrocarbons is more difficult and requires many steps, including the introduction and placement of various components, additives and agents at relatively precise locations downhole.

One such more complicated process involves hydraulically fracturing the subterranean formation—literally breaking or fracturing a portion of the strata surrounding the wellbore. The development of suitable fracturing fluids to provide the necessary hydraulic force is a complex art because the fluids must simultaneously meet a number of conditions. For example, they must be stable at high temperatures and/or high pump rates and high shear rates which can cause the fluids to degrade and prematurely settle out the proppant before the fracturing operation is complete. Various fluids have been developed, but most commercially used fracturing fluids are aqueous based liquids which have either been gelled or foamed. When the fluids are gelled, typically a polymeric gelling agent, such as a solvatable polysaccharide is used, which may or may not be crosslinked. The thickened or gelled fluid helps keep the proppants within the fluid during the fracturing operation.

Aqueous fluids gelled with viscoelastic surfactants (VESs) are also known in the art. VES-gelled fluids have been widely used as gravel-packing, frac-packing and fracturing fluids because they exhibit excellent rheological properties. VES fluids are non-filter cake-building fluids.

In some cases aqueous fluids are gelled with both a VES and a hydratable polymer to gain some of the advantages of both gelled fluid types. While such hybrid fluids may be "broken" or have their viscosities reduced by a separate conventional VES-gel breaker and a separate polymer gel breaker, it would be desirable if one breaker system could be devised for such hybrid fluids.

SUMMARY

In one non-limiting embodiment there is provided a method for reducing the viscosity of an aqueous fluid gelled with a viscoelastic surfactant that involves adding to the aqueous fluid gelled with a viscoelastic surfactant a dual-functional breaker emulsion. The dual-functional breaker emulsion is added in an amount effective to reduce the viscosity of the aqueous fluid. The dual-functional breaker emulsion includes an oil external phase containing an oil-soluble surfactant, and a water internal phase containing a water-soluble polymer breaker; and reducing the viscosity of the aqueous fluid.

Additionally, there is provided, in one form, a method for reducing the viscosity of an aqueous fluid gelled with both a viscoelastic surfactant and a polymer. The method involves adding to the aqueous fluid gelled with both a viscoelastic surfactant and a polymer a dual-functional breaker emulsion. The emulsion is added in an amount effective to reduce the viscosity of the aqueous fluid. The dual-functional breaker emulsion includes an oil external phase that contains an oil-soluble surfactant, and a water internal phase that contains a water-soluble polymer gel breaker, such as an oxidizer, an enzyme and/or an acid. The viscosity of the aqueous fluid is reduced first by the oil-soluble surfactant breaking the VES-gelled portion of the fluid and subsequently by the water-soluble oxidizer breaking the polymer-gelled portion of the fluid.

There is further provided in another non-limiting embodiment the dual-functional breaker emulsion itself which includes an oil external phase containing an oil-soluble surfactant, and a water internal phase containing a water-soluble oxidizer, an enzyme and/or an acid.

DETAILED DESCRIPTION

Over the past decade, the majority of wells drilled have required hydraulic fracturing treatments to become economically profitable. The primary objective for hydraulic fracturing is to create a high conductivity path from the wellbore to deep within the hydrocarbon bearing reservoir. Traditionally, the most widely used fracturing fluid systems have been crosslinked polymer fluids. These fluids exhibit exceptional viscosity, thermal stability, proppant transportability, and fluid leak-off control. However, a major drawback of crosslinked polymer fluids is the amount of polymer residue they too often leave behind that causes fracture conductivity loss.

New remediation technology has been discovered that will enable post-treatment removal of residual polymer from hydraulic fractures. New internal breakers have been developed that remain within the surfactant micelle structures wherever they go during the treatment with a VES-gelled aqueous fluid. After targeted remedial fluid placement and micelle breaking within the hydraulic fracture, polymer breakers held in a water-in-oil emulsion may be released to degrade the residual polymer masses within the fracture. Such remediation technology provides a more complete breaking of the gel since the internal breakers are present within the gel rather than having to closely contact the gel from a separate fluid that must diffuse to and through the gel, often making incomplete contact. The dual-functional breakers may also be used in a VES-only-gelled fluid which contacts a polymer-gelled fluid or a filter cake in the wellbore or other locations to degrade the polymer chains to improve clean up of polymer-gelled fluid or polymer filter cake.

It has been discovered that incorporating water-soluble polymer breakers into a mixture of oil-soluble surfactants and oil creates an emulsion that can then perform as a dual-functional breaker emulsion for breaking hybrid gelled fluids containing both gels formed by polymers and formed by one or more VES. The outer phase of the dual-functional breaker emulsion is oil, such as mineral oil, which contains an oil-soluble surfactant that will over time and with heat (elevated temperature) break the VES gel, such as the methods described in Baker Hughes Incorporated U.S. Pat. No. 7,696,135. As the oil-soluble surfactant breaks the VES gel, the internal aqueous phase polymer breaker within the mineral oil will be released and then break the polymer, whether the polymer is within the gelled fluid, or within the wellbore, or within a hydraulic fracture, or in the form of filter cake or residual polymer. This is accomplished by breaking the polymer chains. The components, mechanisms, and performance characteristics of the dual-functional breaker emulsion and its efficiency for breaking a hybrid fluid having delayed release of polymer breaker that can also be utilized for removing residual crosslinked polymer from stimulated propped fractures will be described.

In a sequence, the polymer gel will not start to break before the VES gel does. As will be demonstrated, laboratory tests showed that the dual-functional breaker emulsion (emulsified breaker) breaking the hybrid fluid is slower than that of a non-emulsified breaker that contains the same chemical breakers in the same amounts as in the dual-functional breaker emulsion—but which are not emulsified together.

The hybrid fluids with dual-functional breaker emulsion may be used for regular hydraulic fracturing, acid diverting, frac-packing, gravel packing, and for remedial cleanup treatments. Additionally, the dual-functional breaker emulsion may also be used in a VES-gelled aqueous fluid as a pad, and then followed by a crosslinked polymer fluid to carry proppant into the fracture. After the VES-gelled fluid used in the pad stage is broken by oil and oil-soluble surfactant in the outer phase of the dual-functional breaker emulsion, the water-based polymer breaker(s) in the internal phase of the dual-functional breaker emulsion are released to enhance the breaking of the following polymer fluid-proppant stage.

It will be appreciated that the dual-functional breaker emulsion described herein may be used either as an external breaker or an internal breaker of the hybrid gelled fluids. By the term "internal breaker" is meant that the breaker is present in the fluid along with the composition causing the increase in viscosity, e.g. polymers and/or VESs, as contrasted with adding the breaker to the gelled fluid separately, for instance, injecting the breaker downhole after the gelled treating fluid.

Liquids gelled with polymers have increased viscosity due to the long polymer chains which may become entangled. Viscosity may be further increased by crosslinking the polymer chains. Polymer gelled fluids may form polymeric filter cakes on and within the formation. Some polymers are naturally occurring, such as xanthan gum, guar gum and starch. Other polymers are modified natural polymers, such as derivatives of guar gum (hydroxypropyl guar (HPG), carboxymethyl HPG (CMHPG)), carboxymethylcellulose (CMC), hydroxyethylcellulose (HEC), carboxymethyl, hydroxyethylcellulose (CMHEC) and hydropropyl starch and lignosulfonate. Some are synthetic such as polyacrylates and polyacrylamides. Polymers may be classified by their structure and may be linear or branched, and in turn, crosslinked. Crosslinkers include, but are not necessarily limited to borate, titanate, zirconate, chromate, and combinations thereof. Copolymers contain two or more different monomers that can be arranged randomly or in blocks. As noted, in solution, entangled polymer chains can create networks, giving complex viscosity behavior. Generally, the amount of polymer gelling agent may range from about 0.1 to about 10 vol %, based on the total aqueous fluid; alternatively about 0.5 independently to about 3 vol %. By "independently" herein is meant that any lower threshold may be combined with any upper threshold. Reducing the viscosity or molecular weight of the polymer component, whether in a gelled fluid, within a fracture or in a filter cake or elsewhere involves degrading the polymer chains.

In contrast, viscoelastic type surfactants generate viscosity in aqueous fluids by forming unique elongated micelle arrangements. These unique arrangements have often been referred to as worm-like or rod-like micelles structures. The increase in viscosity is believed due to the entanglement of the worm-like or elongated micelles. Additionally, VES gelled aqueous fluids may exhibit very high viscosity at very low shear rates and under static conditions, and this fluid property may be further enhanced by the addition of select particles that associate the micelles together into a stronger network or a more connected network.

In the methods and compositions described herein, for instance an aqueous fracturing fluid, as a non-limiting example, is first prepared by blending a VES into an aqueous base fluid. The aqueous base fluid could be, for example, water, brine, aqueous-based foams or water-alcohol mixtures. The brine base fluid may be any brine, conventional or to be developed which serves as a suitable media for the various components. As a matter of convenience, in many cases the brine base fluid may be the brine available at the site used in the completion fluid, for a non-limiting example.

As noted, the aqueous fluids gelled by the VESs herein may optionally be brines. In one non-limiting embodiment, the brines may be prepared using salts including, but not necessarily limited to, NaCl, KCl, $CaCl_2$, $MgCl_2$, $NH_4Cl$, $CaBr_2$, NaBr, sodium formate, potassium formate, cesium formate, and other commonly used stimulation and completion brine salts. The concentration of the salts to prepare the brines can be from about 0.5% by weight of water up to near saturation for a given salt in fresh water, such as 10%, 20%, 30%, 40% and higher percent salt by weight of water. The brine may be a combination of one or more of the mentioned salts, such as a brine prepared using NaCl and CaCl$_2$ or NaCl, CaCl$_2$, and CaBr$_2$ as non-limiting examples.

The viscoelastic surfactants suitable for use herein may include, but are not necessarily limited to, non-ionic, cationic, amphoteric, and zwitterionic surfactants. Specific examples of zwitterionic/amphoteric surfactants include, but are not necessarily limited to, dihydroxyl alkyl glycinate, alkyl ampho acetate or propionate, alkyl betaine, alkyl amidopropyl betaine and alkylimino mono- or di-propionates derived from certain waxes, fats and oils. Quaternary amine surfactants are typically cationic, and the betaines are typically zwitterionic. The thickening agent may be used in conjunction with an inorganic water-soluble salt or organic additive such as phthalic acid, salicylic acid or their salts.

Some non-ionic fluids are inherently less damaging to the producing formations than cationic fluid types, and are more efficacious per pound than anionic gelling agents. Amine oxide viscoelastic surfactants have the potential to offer more gelling power per pound, making it less expensive than other fluids of this type.

The amine oxide gelling agents $RN^+(R')_2O^-$ may have the following structure (I):

where R is an alkyl or alkylamido group averaging from about 8 to 24 carbon atoms and R' are independently alkyl groups averaging from about 1 to 6 carbon atoms. In one non-limiting embodiment, R is an alkyl or alkylamido group averaging from about 8 to 16 carbon atoms and R' are independently alkyl groups averaging from about 2 to 3 carbon atoms. In an alternate, non-restrictive embodiment, the amine oxide gelling agent is tallow amido propylamine oxide (TAPAO), which should be understood as a dipropylamine oxide since both R' groups are propyl.

Materials sold under U.S. Pat. No. 5,964,295 include CLEAR-FRAC™, which may also comprise greater than 10% of a glycol. This patent is incorporated herein in its entirety by reference. One preferred VES is an amine oxide. As noted, a particularly preferred amine oxide is tallow amido propylamine oxide (TAPAO), sold by Baker Hughes Incorporated as SURFRAQ™ VES. SURFRAQ is a VES liquid product that is 50% TAPAO and 50% propylene glycol. These viscoelastic surfactants are capable of gelling aqueous solutions to form a gelled base fluid. The additives herein may also be used in DIAMOND FRAQ™ which is a VES system, similar to SURFRAQ, which contains VES breakers sold by Baker Hughes Incorporated.

The amount of VES included in the treating fluid depends on the type of application. For hydraulic fracturing treatments, the concentration of VES product to use is related to generating, creating or producing enough fluid viscosity to control the rate of fluid leak off into the pores of the fracture, which is also dependent on the type and amount of fluid loss control agent used, and both work together to improve fluid efficiency to develop the optimum size and geometry of the fracture within the reservoir for enhanced reservoir production of hydrocarbons and to also keep the chemicals, particles (e.g. proppant or other particles) and/or other agent complexed, suspended or viscosity trapped therein during the fluid injecting step.

For remedial treatments, such as removal of residual crosslinked polymer filter cake typically left within a hydraulic fracture after a crosslinked polymer fluid fracturing treatment, the distribution of an acid, an enzyme or oxidative polymer breaker agent within the damaged hydraulic fracture can be significantly improved by using a hybrid treating fluid containing a moderate to high amount of VES product in combination with a VES micelle associating fluid loss agent but also the dual-functional breaker emulsion described herein. The micelle associating agent allows the development of pseudo-filter cake to: 1) reduce the amount of treating fluid leak-off away from the fracture; and 2) keep more treatment fluid within the hydraulic fracture and thereby significantly improve the distribution of the dual-functional breaker emulsion containing polymer breaker. Such agents associate or connect the elongated micelles in such a way that the entanglement and thus viscosity increases.

Thus, in many applications, the VES is added to the aqueous fluid in concentrations ranging from about 0.5 to about 12.0% by volume of the total aqueous fluid (5 to 120 gallons per thousand gallons (gptg); SI units would be the same value of any convenient volume, e.g. 5 to 120 liters per thousand liters). In another non-limiting embodiment, the range is from about 1.0 to about 6.0% by volume VES product. In an alternate, non-restrictive form, the amount of VES ranges from about 2 to about 10 volume %.

For the polymer-gelled portion of the hybrid fluids herein, conventional polymer breakers include, but are not limited to, enzymes, oxidizers, bacteria, acids, and combinations thereof. It is expected that water-soluble oxidizers will find particular utility in the dual-functional breaker emulsions described herein. Suitable water-soluble oxidizers include, but are not necessarily limited to, ammonium persulfate, sodium persulfate, potassium persulfate, sodium peroxide, barium peroxide, hydrogen peroxide, magnesium peroxide, potassium peroxide, sodium perborate, potassium perborate, potassium permanganate, sodium permanganate, percarbonate, bromate, perphosphate, and combinations thereof. Suitable enzyme breakers for polymer gelled fluids include, but are not necessarily limited to, amylase, hemi-cellulase, and the like. Suitable acid breakers include organic acids such as acetic acid, formic acid, and the like.

In an alternate non-restrictive embodiment, for breaking the VES-gelled portion of the hybrid fluids herein the suitable oil-soluble surfactants (OSSs) include, but are not limited to, sorbitan fatty acid esters, saponified hard oils, saponified hydrogenated fatty acid oils, long chain alcohols, long chain fatty acid alcohols, long chain fatty amines, long chain sulfates, long chain sulfonates, phosopholipids, lignins, ethoxylated castor oil and combinations thereof. Specific suitable OSSs include, but are not limited to, sorbitan fatty acid esters available from Uniqema as SPAN® 20 sorbitan monolaurate, SPAN® 40 sorbitan monopalmitate, SPAN® 61 sorbitan monostearate, SPAN® 65 sorbitan tristearate, SPAN® 80 sorbitan monooleate, SPAN® 85 sorbitan trioleate, TWEEN® 20 sorbitan monolaurate (with 20 POE (polyoxyethylene) units), TWEEN® 21 sorbitan monolaurate (POE (4)), TWEEN® 40 sorbitan monopalmitate (POE (20)), TWEEN® 60 sorbitan monostearate (POE (20)), TWEEN® 61 sorbitan monostearate (POE (4)), TWEEN® 65 sorbitan tristearate (POE (20)), TWEEN® 80 sorbitan monooleate (POE (20)), TWEEN® 81 sorbitan monooleate (POE (4)), TWEEN® 85 sorbitan trioleate (POE (20)). The term "long chain" as used herein with respect to the oil-soluble surfactants means from about 10 to about 30 carbon atoms.

It will be understood that the oil-soluble surfactant also functions to create the dual-functional emulsion breaker between the oil phase and the aqueous phase as well as aid in reducing the viscosity of the VES portion of the gelled aqueous fluid. The dual-functional emulsion breaker may also contain other co-surfactants and/or co-solvents useful in establishing the emulsion as long as they are of a type and quantity that do not appreciably interfere with the breaking function of the emulsion.

In another non-limiting version of the dual-functional breaker emulsion, the volume ratio of oil external phase to oil-soluble surfactant to water internal phase is: about 55 to about 85 vol % oil external phase to about 0.5 to about 10 vol % oil-soluble surfactant to about 5 to about 44.5 vol % water internal phase. In a non-restrictive alternative embodiment of the dual-functional breaker emulsion, the volume ratio of oil external phase to oil-soluble surfactant to water internal phase is: about 70 to about 83 vol % oil external phase to about 1 to about 5 vol % oil-soluble surfactant to about 12 to about 29 vol % water internal phase.

Within the above volume ratios, the concentration of water-soluble oxidizer in the water internal phase ranges from about 5 to about 50 weight %; alternatively from about 10 independently to about 30 weight %.

The oil external phase of the dual-functional breaker emulsion may employ one or more mineral oil (as a non-limiting example of a suitable breaker). It should be understood that hydrocarbons in general are known as relatively quick breakers for VES-gelled aqueous fluids and are known to break them on contact. However, certain mineral oils as described herein serve as breaking components for VES-gelled aqueous fluids, but not as instantaneous breakers or immediate breakers "on contact" with the VES-gelled aqueous fluids. This is surprising because the literature teaches that contact of a VES-gelled fluid with hydrocarbons, such as those of the subterranean formation in a non-limiting example, essentially instantaneously reduces the viscosity of the gel or "breaks" the fluid. By "essentially instantaneously" is meant less than one-half hour.

The rate of viscosity break for a given reservoir temperature by the methods described herein is influenced by type and amount of salts within the mix water (i.e. seawater, KCl, NaBr, CaCl$_2$, CaBr$_2$, NH$_4$Cl and the like), presence of a co-surfactant (i.e. sodium dodecyl sulfate, sodium dodecyl benzene sulfonate, potassium laurate, potassium oleate, sodium lauryl phosphate, and the like), VES type (i.e. amine oxide, quaternary ammonium salt, and the like), VES loading, the amount of breaker (e.g. mineral oil and oil-soluble surfactant) used, the distillation range of the mineral oil, its kinematic viscosity, the presence of components such as aromatic hydrocarbons, and the like.

It is important to add the dual-functional breaker emulsion containing lower molecular weight mineral oils after the VES product is added to the aqueous fluid and the fluid is substantially gelled. The polymers used for gelling the water may be added before, during or after the VES and/or the dual-functional breaker emulsion are added.

However, for higher molecular weight mineral oils, types like GLORIA® and HYDROBRITE® 200 from Crompton Corporation, they may be added before, during or after the VES product addition. Mineral oil (also known as liquid petrolatum) is a by-product in the distillation of petroleum to produce gasoline. It is a chemically inert transparent colorless oil composed mainly of linear, branched, and cyclic alkanes (paraffins) of various molecular weights, related to white petrolatum. Mineral oil is produced in very large quantities, and is thus relatively inexpensive. Mineral oil products are typically highly refined, through distillation, hydrogenation, hydrotreating, and other refining processes, to have improved properties, and the type and amount of refining varies from product to product. Highly refined mineral oil is commonly used as a lubricant and a laxative, and with added fragrance is marketed as "baby oil" in the U.S. Most mineral oil products are very inert and non-toxic, and are commonly used as baby oils and within face, body and hand lotions in the cosmetics industry. Other names for mineral oil include, but are not necessarily limited to, paraffin oil, paraffinic oil, lubricating oil, base oil, white mineral oil, and white oil.

In one non-limiting embodiment the mineral oil is at least 99 wt % paraffinic. Because of the relatively low content of aromatic compounds, mineral oil has a better environmental profile than other oils. In general, the more refined and less aromatic the mineral oil, the better. In another non-restrictive version, the mineral oil may have a distillation temperature range from about 160 to about 550° C., alternatively have a lower limit of about 200° C. and independently an upper limit of about 480° C.; and a kinematic viscosity at 40° C. from about 1 to about 250 cSt, alternatively a lower limit of about 1.2 independently to an upper limit of about 125 cSt. Specific examples of suitable mineral oils include, but are not necessarily limited to, BENOL®, CARNATION®, KAYDOL®, SEMTOL®, HYDROBRITE® and the like mineral oils available from Crompton Corporation, ESCAID®, EXXSOL® ISOPAR® and the like mineral oils available from ExxonMobil Chemical, and similar products from other mineral oil manufacturers. The ESCAID 110® and Conoco LVT-200® mineral oils have been well known components of oil-based drilling muds and the oil industry has considerable experience with these products, thus making them attractive choices. The mineral oils from ConocoPhillips Company with their high purity and high volume use within other industries are also an attractive choice, such as 600N PURE PERFORMANCE® Base Oil.

It has been discovered in breaking VES-gelled fluids prepared in monovalent brines (such as 3% KCl brine) that at temperatures below about 180° F. (82° C.) ESCAID® 110 works well in breaking VES-gelled fluids, and that at or above about 140° F. (60° C.) HYDROBRITE® 200 works well. The use of mineral oils herein is safe, simple and economical. In some cases for reservoir temperatures between about 120° to about 240° F. (about 49° to about 116° C.) a select ratio of two or more mineral oil products, such as 50 wt % ESCAID® 110 to 50 wt % HYDROBRITE® 200 may be used to achieve controlled, fast and complete break of a VES-gelled fluid.

It has also been discovered that type and amount of salt within the mix water used to prepare the VES fluid (such as 3 wt % KCl, 21 wt % CaCl$_2$, use of natural seawater, and so on) and/or the presence of a VES gel stabilizer (such as VES-STA 1 available from Baker Hughes Incorporated) may affect the activity of a mineral oil in breaking a VES fluid at a given temperature. For example, ESCAID® 110 at 5.0 gptg will readily break the 3 wt % KCl based VES fluid at 100° F. (38° C.) over a 5 hour period. ESCAID® 110 also has utility as a breaker for a 10.0 ppg CaCl$_2$ (21 wt % CaCl$_2$) based VES fluid at 250° F. (121° C.) when a VES stabilizer (2.0 pptg VES-STA 1) is included. More information about using mineral oils, hydrogenated polyalphaolefin oils and saturated fatty acids as internal breakers may be found in U.S. Pat. No. 7,347,266, incorporated by reference herein in its entirety.

In one non-limiting embodiment these VES gel-breaking products or breakers work by rearrangement of the VES micelles from rod-shaped or worm-shaped elongated structures to spherical structures. In another non-limiting embodiment, natural saturated hydrocarbons such as terpenes (e.g. pinene, d-limonene, etc.), saturated fatty acids (e.g. lauric acid, palmitic acid, stearic acid, etc. from plant, fish and/or animal origins) and the like may possibly be used together with or alternatively to the mineral oils herein. Other refinery distillates may potentially be used in addition to or alternatively to the mineral oils described herein, as may be hydrocarbon condensation products. Additionally, synthetic mineral oils, such as hydrogenated polyalphaolefins, and other synthetically derived saturated hydrocarbons may be of utility to practice the methods herein.

In one non-limiting embodiment, the breaking or viscosity reduction is triggered or initiated or facilitated by heat. These mineral oils will slowly, upon heating, break or reduce the viscosity of the VES gel with the addition of or in the absence of any other VES viscosity reducing agent, although in most embodiments herein oil-soluble surfactants will also be present. The amount of internal breaker (mineral oil, e.g.), needed to break a VES-gelled fluid may in some cases be temperature dependent, with less needed as the fluid temperature increases. For mineral oil, the kinematic viscosity, molecular weight distribution, and amount of impurities (such as aromatics, olefins, and the like) also appear to influence the breaking behavior. Once a fluid is completely broken at an elevated temperature and cooled to room temperature a degree of viscosity reheal may occur but in most cases no rehealing is expected. The effective amount of mineral oil ranges from about 0.1 to about 20 gptg based on the total fluid, in another non-limiting embodiment from a lower limit of about 0.5 gptg, where "total fluid" means overall VES gelled fluid with all components of the particular embodiment. Independently the upper limit of the range may be about 12 gptg based on the total fluid. (It will be appreciated that units of gallon per thousand gallons (gptg) are readily converted to SI units of the same value as, e.g. liters per thousand liters, $m^3/1000\ m^3$, etc.).

Controlled viscosity reduction rates can be achieved at a temperature of from about 70° F. to about 400° F. (about 21 to about 204° C.), and alternatively at a temperature of from about 100° F. independently to an upper end of the range of about 280° F. (about 38 to about 138° C.), and in another non-limiting embodiment independently up to about 300° F. (149° C.). In one non-limiting embodiment, the fluid designer would craft the fluid system in such a way that the VES gel would break at or near the formation temperature to deliver the agent downhole at a predetermined or designed location.

In one non-limiting embodiment, fluid internal breaker design would be based primarily on formation temperature, i.e. the temperature the fluid will be heated to naturally in the formation once the acidizing, fracturing or other treatment is over. Fluid design may take into account the expected duration or exposure of the fluid at formation temperature during a treatment. There would generally be no additional temperature or heating the VES/polymer-gelled fluid would see or experience other than original reservoir temperature.

It is sometimes difficult to specify with accuracy in advance the amount of the various breaking components that should be added to a particular hybrid aqueous fluid gelled with at least one polymer and at least one viscoelastic surfactant to sufficiently or fully break the gel, in general. For instance, a number of factors affect this proportion, including but not necessarily limited to, the particular VES used to gel the fluid; the particular breakers used (e.g. mineral oil, oil-soluble surfactant, oxidizer, enzyme, acid, etc.); the temperature of the fluid; the downhole pressure of the fluid, the starting pH of the fluid; and the complex interaction of these various factors. Nevertheless, in order to give an approximate idea of the proportions of the various breaking components to be used in the methods herein, approximate ranges will be provided. The effective amount of the dual-functional breaker emulsion ranges from about 0.5 to about 60 gptg based on the gelled aqueous fluid; alternatively the effective amount of the dual-functional breaker emulsion ranges from about 2 independently to about 20 gptg based on the gelled aqueous fluid.

The use of the disclosed dual-functional breaker emulsion systems is ideal for controlling viscosity reduction of hybrid polymer/VES based fracturing treating fluids. The breaking system may also be used for breaking similar hybrid gravel pack fluids, acidizing or near-wellbore clean-up fluids, loss circulation pill fluids that include both polymers and VES, drilling fluids composed of polymers and VES, and for many other applications. The dual-functional breaker emulsion system may additionally work for foamed fluid applications (hydraulic fracturing, acidizing, and the like), where $N_2$ or $CO_2$ gas is used for the gas phase. The breaking methods herein are a significant improvement in that it gives breaking rates for hybrid polymer/VES based fluids that the industry is accustomed to with conventional polymer-only based fluids, such as borate crosslinked guar and linear HEC (hydroxyethylcellulose).

In one non-limiting embodiment, the dual-functional breaker emulsion herein will degrade the gel created by a VES in an aqueous fluid, by disaggregation or rearrangement of the VES micellar structure. Stated another way, the dual functional breaker degrades the VES micelle viscosity. However, the inventors do necessarily not want to be limited to any particular mechanism. Also, in another non-restrictive version, the only components present in the VES gelled aqueous fluid that reduces VES-caused viscosity is one of the mineral oil or oil-soluble surfactant internal breakers described herein, or mixtures thereof, and the only polymer breaker employed to reduce polymer-caused viscosity is the oxidizer and/or enzyme and/or acid taken singly or in any combination of two, or all three together. That is, a separately introduced external breaker component introduced after the polymer/VES-gelled fluid is not used (e.g. various clean-up fluids or external breakers). However, conditions (such as elevated temperature) and already existing chemicals (reservoir hydrocarbons) may be present when and where the internal breakers described herein are included, either intentionally or incidentally.

The compositions of the hybrid gelled fluids herein may be a combination of the noted internal breakers with one or more high temperature optional stabilizers, optional viscosity enhancers, fluid loss control agents, and mix water brines up to 14.4 ppg salinity (1.7 kg/liter), e.g. $CaBr_2$. The internal breakers described herein work in the presence of several types of VES micelle stabilizers, micelle viscosity enhancers, micelle fluid loss control agents, a wide range of mix water salinity (including divalent ions like calcium and magnesium) for fluid temperature applications ranging from about 80° F. to about 300° F. (about 27 to about 149° C.). The ability of these agents to work together by compatible mechanisms is unique and allows the many enhanced VES fluid performance properties to be combined.

In polymer filter cake, most of breaker in the polymer fluid system is leaked-off into the formation matrix and leaves a high concentration of polymer in the cake (fracture). The breaker is not attached to or connected with the polymer. However, in the case of the methods and compositions herein, the oxidizer breaker, or other polymer breaker, is in the aqueous internal phase and prevented or inhibited from breaking the polymer-gelled component of the fluid and of the filter cake by the oil external phase. It takes awhile for the mineral oil and the oil-soluble surfactant to break the VES component of the hybrid fluid before the water-soluble oxidizer is released to break the polymer-gelled component of the hybrid gelled fluid.

Additionally, the use of internal breakers with the pseudo-filter cake formed by the VES component of the hybrid fluid has been discovered to allow the pseudo-filter cake to be readily degraded into an easily producible broken VES fluid. Another improved performance feature is how the fluids herein, a portion of which may inevitably leak-off into the pores of the reservoir during a treatment, can carry with the dual-functional breaker emulsion that converts the hybrid VES/polymer fluid into an easily producible or flowable fluid without the need for contacting reservoir hydrocarbons.

Contact of a VES-gelled aqueous fluid with reservoir hydrocarbons is one method of breaking the viscosity of these fluids. However, the methods and fluids herein are significant improvements over conventional methods and compositions, which, without contacting hydrocarbons, exhibit very high viscosity at very low shear rates, such as 2000 cps or more at 1 $sec^{-1}$ shear rate.

A hybrid-gelled aqueous fluid system containing the dual-functional breaker emulsion described herein may also optionally contain VES viscosity enhancers, VES stabilizers for high temperature, and fluid loss control agents.

A viscous gel starts to develop when the viscoelastic surfactant (VES) and the polymer is mixed with an aqueous base fluid. A salt or other counterion may be used in the aqueous fluid containing VES to help promote viscous micelle formation. The hybrid gelled fluid (in one non-limiting embodiment, a fracturing fluid) is pumped in one or more sequential stages. The stages of hybrid gelled fluid that contains the dual-functional breaker emulsion maintains a high viscosity prior to fracturing and/or other treating fluid applications and eventual breaking (viscosity reduction) of the fluid through action of the mineral oil breaker, oil-soluble surfactant breaker and oxidizer breaker.

Aqueous fluids gelled with viscoelastic surfactants have been previously used in wellbore completions, such as hydraulic fracturing, without the use of an internal breaker system, and typically rely on external downhole conditions for the VES-gelled fluid to break, such as dilution with reservoir brine and more importantly gel breaking through interaction with reservoir hydrocarbons during production of such reservoir fluids to the surface. However, reliance on external downhole conditions has showed instances where unbroken or poorly broken VES fluid remains within the reservoir after a VES fluid treatment and has impaired hydrocarbon production. There are aqueous fluids gelled with viscoelastic surfactants that are known to be "broken" or have their viscosities reduced, although some of the known breaking methods utilize external clean-up fluids as part of the treatment design (such as pre- and post-flush fluids placed within the reservoir before and after well completion treatments, such as conventional gravel packing and also "frac-packing"—hydraulic fracturing followed by gravel packing treatment). There are other known methods, but they are relatively slow—for instance the use of VES-gel breaking bacteria with fluid viscosity break times ranging from half a day up to 7 days. There has evolved in the stimulation fluid art an industry standard need for "quick gel break", but for VES-gelled fluids this has been a substantially challenging problem. There needs to be a method for breaking VES-gelled fluids that can be as easy, as quick, and as economic as breaking conventional polymeric fluids, in one non-limiting embodiment, using an internal breaker. At the same time, it is not desirable to reduce the viscosity of the fluid, i.e. break the gel, immediately or essentially instantaneously. Of concern is the fact than an unbroken VES fluid has exceptionally high viscosity at very low shear rate and static conditions which makes it difficult for reservoir hydrocarbons to contact all of the VES fluid and to displace it from the pores of a treated reservoir. This is particularly true for gas reservoirs and crude oil reservoirs that have heterogeneous permeability with high relative permeability sections present.

As described herein new compositions and new methods have been discovered using dual-functional breaker emulsions to reduce the viscosity of aqueous fluids gelled with both polymers and viscoelastic surfactants. The new methods remove the need or reliance on reservoir hydrocarbons to contact, break, and cleanup the VES-component of the viscoelastic fluid. The improvements will allow relatively very quick breaks, such as within about 1 to about 16 hours, compared to using bacteria to break VES which takes at least 48 or more hours, and more typically 4 to 7 days. In another non-limiting embodiment the break occurs within about 1 to about 8 hours; alternatively from about 1 to about 4 hours, and in another non-restrictive version about 1 to about 2 hours. The dual-functional breaker emulsion herein can be used as an internal breaker, e.g. added to the gel after batch mixing of a VES/polymer-gel treatment, or added on-the-fly after continuous mixing of a VES/polymer-gel treatment using a liquid additive metering system in one non-limiting embodiment, or the dual-functional breaker emulsion may be used separately, if needed, as an external breaker solution to remove hybrid gelled fluids already placed downhole.

The dual-functional breaker emulsion, being oil phase external, are not solubilized in the brine, since they are inherently hydrophobic, but may rather interact with the VES surfactant worm-like micelle structures and/or the polymers initially as dispersed microscopic oil droplets and thus form a type of water-in-oil-in-water double emulsion where the dual-functional breaker emulsion droplets are dispersed in the "internal phase" as a "discontinuous phase" of the brine medium/VES fluid which is the "outer phase" or "continuous phase".

The invention will now be further illustrated with respect to particular Examples which are not intended to limit the invention in any regard, but instead are intended to further describe and illuminate certain non-restrictive embodiments of the invention.

Example 1

Figure 1:
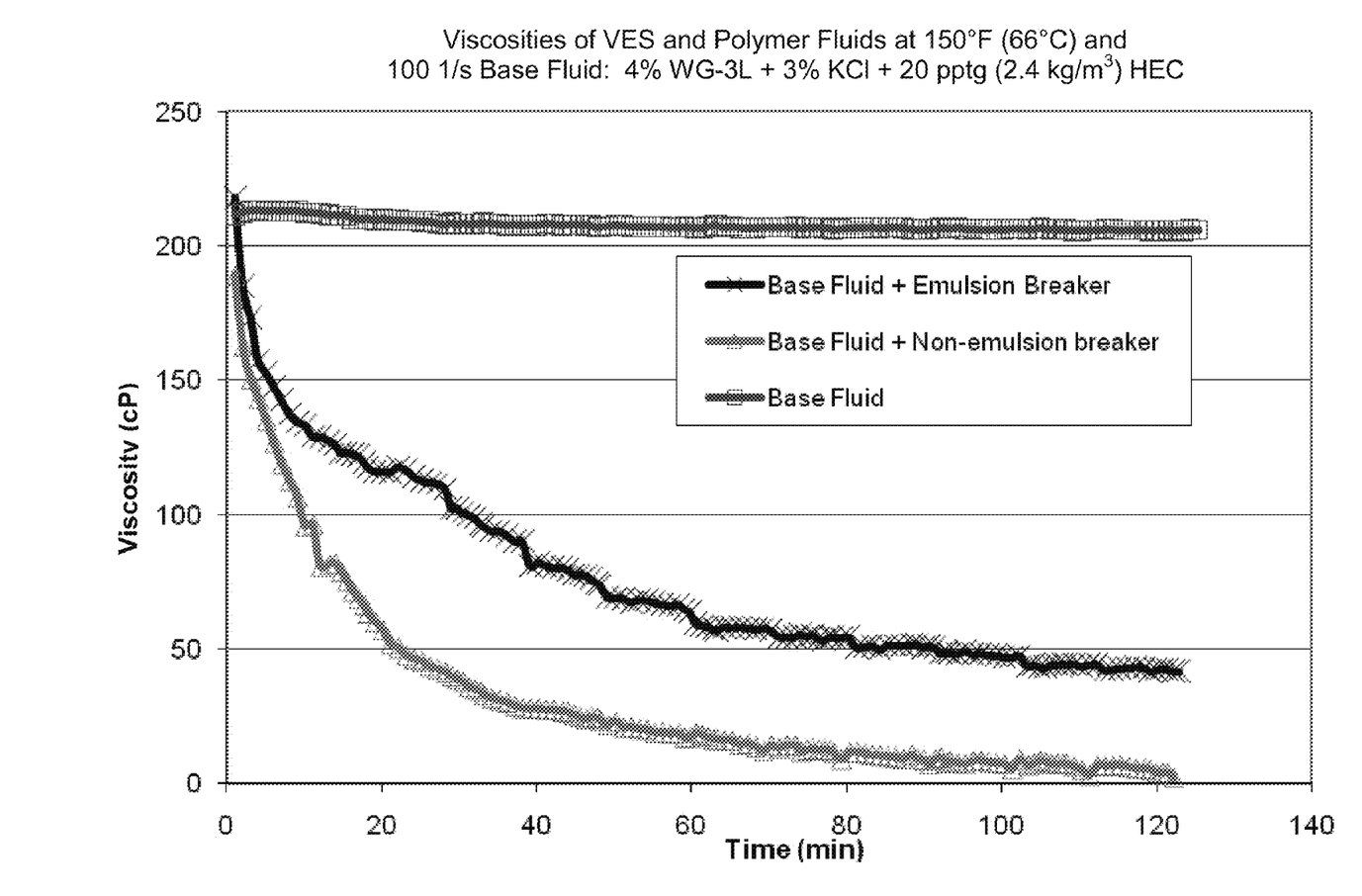
FIG. 1 is a graph of the viscosity of a hybrid fluid gelled with both a VES (WG-3L) and a polymer at 150° F. (66° C.) measured at 100 1/s as a function of time showing the results from the base fluid with no breaker, the base fluid broken with a dual-functional emulsion breaker as described herein and the base fluid broken with the same breakers in the same amounts as in the emulsion breaker except that the breakers are not in an emulsion.

For the data presented in FIG. 1, the dual-functional breaker emulsion is a 2% by volume (bv) emulsion of the following: 83% bv 600N Conoco-Phillips PURE PERFORMANCE Base Oil+2% by oil-soluble sorbitan monooleate surfactant SPAN 80, available from Uniqema+15% bv of 50% by weight water solution of ammonium persulfate oxidizer (thus the dual-functional emulsion breaker components total 100%). The chemical compounds are added to a blender mixing at high speed for 20 minutes to generate the emulsion.

The base fluid was 4 vol % of WG-3L surfactant (AROMOX® APA-T VES available from Akzo Nobel) and 20 pptg (2.4 $kg/m^3$) of HEC polymer. Viscosities were measured at 150° F. (66° C.) and 100 1/s. The viscosity of the base fluid alone over time is the upper most curve in FIG. 1 and, as would be expected, its viscosity only slowly diminishes over time since no breaker is present. The dual-functional breaker emulsion of this Example is the middle curve showing a definite drop in viscosity as a function of time. However, if the same breakers, i.e. 600N ConocoPhillips PURE PERFOR- MANCE Base Oil, oil-soluble sorbitan monooleate surfactant SPAN 80 and ammonium persulfate oxidizer are used in the same amounts, but not emulsified as described above, the breaking is notably much quicker (lowest curve of FIG. 1). Thus, the dual-functional breaker emulsions described herein give a slower, but still pronounced breaking effect as compared with the identical components in identical amounts which have not been emulsified.

To clarify, it should be understood that the term dual-functional breaker emulsion refers to the "breaking" or viscosity reduction of a fluid gelled both with a polymer and a VES and not the breaking of the emulsion itself. The breaking of the emulsion begins to occur when the oil-soluble surfactant and the oil phase in the emulsion starts to break the VES-gelled portion of the hybrid gelled fluid.

In the foregoing specification, the invention has been described with reference to specific embodiments thereof as effective in breaking hybrid fluids gelled with both viscoelastic surfactants and polymers. However, it will be evident that various modifications and changes can be made thereto without departing from the broader spirit or scope of the invention as set forth in the appended claims. Accordingly, the specification is to be regarded in an illustrative rather than a restrictive sense. For example, specific combinations of polymers (e.g. polysaccharides), viscoelastic surfactants, oxidizer and/or enzyme and/or acid breakers for polymers, oil-soluble surfactant breakers for VES-gelled fluids, oil phases, co-surfactants, co-solvents, and other components falling within the claimed parameters, but not specifically identified or tried in a particular composition, are anticipated to be within the scope of this invention.

The present invention may suitably comprise, consist or consist essentially of the elements disclosed and may be practiced in the absence of an element not disclosed. For example, the dual-function breaker emulsion may consist essentially of, or alternatively consist of, an oil external phase containing an oil-soluble surfactant, and a water internal phase containing a water-soluble oxidizer, as further described in the claims. Other water-soluble breakers, such as enzymes, bacteria, acids, and combinations thereof can also be the internal phase of the dual-function breaker emulsion to break polymer.

The words "comprising" and "comprises" as used throughout the claims, are to be interpreted to mean "including but not limited to" and "includes but not limited to", respectively.

What is claimed is:

1. A method for reducing the viscosity of an aqueous fluid gelled with a viscoelastic surfactant comprising:
   adding to the aqueous fluid gelled with a viscoelastic surfactant a dual-functional breaker emulsion in an amount effective to reduce the viscosity of the aqueous fluid, the dual-functional breaker emulsion comprising:
   an oil external phase comprising an oil-soluble surfactant, and
   a water internal phase comprising a water-soluble polymer breaker; and
   reducing the viscosity of the aqueous fluid.

2. The method of claim 1 where the water soluble polymer breaker is selected from the group consisting of an oxidizer, enzyme, acid and combinations thereof.

3. The method of claim 1 further comprising contacting the aqueous gelled fluid with polymer material in a hydraulic fracture to degrade the polymer carbon chains.

4. The method of claim 1 further comprising contacting the aqueous gelled fluid with polymer filter cake material in a wellbore to degrade the polymer carbon chains.

5. A method for reducing the viscosity of an aqueous fluid gelled with both a viscoelastic surfactant and a polymer comprising:
   adding to the aqueous fluid gelled with both a viscoelastic surfactant and a polymer a dual-functional breaker emulsion in an amount effective to reduce the viscosity of the aqueous fluid, the dual-functional breaker emulsion comprising:
   an oil external phase comprising an oil-soluble surfactant, and
   a water internal phase comprising a water-soluble polymer breaker; and
   reducing the viscosity of the aqueous fluid.

6. The method of claim 5 where in the dual-functional breaker emulsion, the volume ratio of oil external phase to oil-soluble surfactant to water internal phase is:
   about 55 to about 85 vol % oil external phase to
   about 0.5 to about 10 vol % oil-soluble surfactant to
   about 5 to about 44.5 vol % water internal phase.

7. The method of claim 6 where the concentration of water-soluble polymer breaker in the water internal phase ranges from about 5 to about 50 weight %.

8. The method of claim 5 where the oil external phase is mineral oil.

9. The method of claim 5 where the oil-soluble surfactant is selected from the group consisting of sorbitan fatty acid esters, saponified hard oils, saponified hydrogenated fatty acid oils, long chain alcohols, long chain fatty acid alcohols, long chain fatty amines, long chain sulfates, long chain sulfonates, phospholipids, lignins, and combinations thereof.

10. The method of claim 5 where the water-soluble oxidizer is selected from the group consisting of ammonium persulfate, sodium persulfate, potassium persulfate, sodium peroxide, barium peroxide, hydrogen peroxide, magnesium peroxide, potassium peroxide, sodium perborate, potassium perborate, potassium permanganate, sodium permanganate, and combinations thereof.

11. The method of claim 5 where the effective amount of the dual-functional breaker emulsion ranges from about 0.5 to about 60 gptg based on the gelled aqueous fluid.

12. The method of claim 5 where reducing the viscosity of the aqueous fluid occurs more slowly as compared to an identical method where the identical amounts of oil external phase, oil-soluble surfactant and water-soluble oxidizer except that these components are not in an emulsion.

13. A method for reducing the viscosity of an aqueous fluid gelled with both a viscoelastic surfactant and a polymer comprising:
   adding from about 0.5 to about 60 gptg of a dual-functional breaker emulsion to the aqueous fluid gelled with both a viscoelastic surfactant and a polymer, based on the gelled aqueous fluid, the dual-functional breaker emulsion comprising:
   an oil external phase comprising an oil-soluble surfactant, and
   a water internal phase comprising a water-soluble polymer breaker;
   where the volume ratio of oil external phase to oil-soluble surfactant to water internal phase is:
   about 55 to about 85 vol % oil external phase to
   about 0.5 to about 10 vol % oil-soluble surfactant to
   about 5 to about 44.5 vol % water internal phase; and
   reducing the viscosity of the aqueous fluid.

14. The method of claim 13 where the concentration of water-soluble oxidizer in the water internal phase ranges from about 5 to about 50 weight %.

15. The method of claim 13 where the oil external phase is mineral oil.

16. The method of claim 13 where the oil-soluble surfactant is selected from the group consisting of sorbitan fatty acid esters, saponified hard oils, saponified hydrogenated fatty acid oils, long chain alcohols, long chain fatty acid alcohols, long chain fatty amines, long chain sulfates, long chain sulfonates, phosopholipids, lignins, and combinations thereof.

17. The method of claim 9 where the water-soluble polymer breaker is selected from the group consisting of ammonium persulfate, sodium persulfate, potassium persulfate, sodium peroxide, barium peroxide, hydrogen peroxide, magnesium peroxide, potassium peroxide, sodium perborate, potassium perborate, potassium permanganate, sodium permanganate, percarbonate, bromate, perphosphate, amylase, hemi-cellulase, acetic acid, formic acid and combinations thereof.

\* \* \* \* \*